(12) United States Patent
Ante et al.

(10) Patent No.: US 8,194,089 B1
(45) Date of Patent: Jun. 5, 2012

(54) ON SCREEN MEASUREMENT TOOL

(76) Inventors: Wolfgang Ante, Vienna (AT); Craig Lemoine Hockenberry, Laguna Beach, CA (US); Corey Bryant Marion, Colfax, NC (US); Travis James Zuker, Randelman, NC (US); Talos Shu-Ming Tsui, Colfax, NC (US); Anthony John Piraino, High Point, NC (US); David Edward Lanham, Greensboro, NC (US); Gedeon Paul Maheux, Colfax, NC (US); David Andrew Brasgalla, Stockholm (SE); Mindy Karol Weaver, Colfax, NC (US)

(*) Notice: Subject to any disclaimer, the term of this patent is extended or adjusted under 35 U.S.C. 154(b) by 812 days.

(21) Appl. No.: 12/231,851

(22) Filed: Sep. 8, 2008

(51) Int. Cl.
 *G09G 5/36* (2006.01)
 *G06K 9/00* (2006.01)
(52) U.S. Cl. ........................................ 345/545; 382/147
(58) Field of Classification Search .......... 345/611–616, 345/620–628, 660–662; 382/106, 173–179, 382/256–257, 266–269, 286, 312
 See application file for complete search history.

(56) References Cited

U.S. PATENT DOCUMENTS

| | | | | |
|---|---|---|---|---|
| 4,716,429 A | * | 12/1987 | Misawa | 396/147 |
| 6,456,275 B1 | * | 9/2002 | Hinckley et al. | 345/156 |
| 2002/0028013 A1 | * | 3/2002 | Sawa et al. | 382/147 |
| 2006/0008779 A1 | * | 1/2006 | Shand et al. | 434/90 |

* cited by examiner

*Primary Examiner* — Kee M Tung
*Assistant Examiner* — Sing-Wai Wu
(74) *Attorney, Agent, or Firm* — Joanne M. Martin

(57) ABSTRACT

A measurement tool overlay program that after initial placement in or around the object field, automatically identifies (in 'expand' mode) any distance between objects by other programs that are displayed on the screen relative to a starting point between the objects. Measures is provided of the dimensions of any object, or group of objects by accessing the picture elements (pixels) in the memory associated with the display screen. Alternate embodiments according to the present invention operate in 'contract' mode. In 'contract' mode, the present invention also provides the measurements of an end user-placed rectangular boundary around any given object(s), or distance between outside edges of clusters of object(s) immediately. The box will contract to the size (edge) of the area as defined by pixels, which may be part of one or more objects within the area and provide the dimensions automatically.

20 Claims, 5 Drawing Sheets

ON SCREEN MEASUREMENT TOOL

FIELD OF THE INVENTION

The Invention relates to methods for measuring of distance between elements, and finding the dimensions and/or boundary of any group of objects on a computation device associated display screen.

BACKGROUND OF THE INVENTION

Previous computer programs/tools were developed to help measuring the distance between objects as well as the width and height of any elements on a computer display screen. The end user was required to manually adjust the measurement tool to the exact width, or height of the element(s) displayed on the screen to their best ability. The process was time consuming, and susceptible to human errors.

SUMMARY OF THE INVENTION

The invention comprises a measurement tool overlay program that after initial placement in or around the object field, automatically identifies any distance between objects by other programs that are displayed on the screen relative to a starting point between the objects. This program/tool measures the dimensions of any object, or group of objects by accessing the picture elements (pixels) in the memory associated with the display screen.

The use of this program/tools is not limited to one program which provides a portion of the image on the display screen. According to the present invention, this program/tool 'sits' on top of other programs and provides system-wide access (via the display memory) to measure all system program images displayed on the display screen. Therefore, the end user can quickly and accurately measures any elements on the display, such as the operating system as well as any applications running on the operating system.

When the tool is activated (e.g. by screen or menu selection), the end user can moves an associated pointer having an associated indicator on the display screen. The end user can constantly move and stop the pointer anywhere on screen, and the measurements will then be displayed automatically on that screen. In one embodiment in 'expand' mode, once the pointer (e.g. a mouse) movement has stopped (at a 'starting position'), vertical and horizontal lines will extend out from the center of the pointer position, and the program will detect the edge and stop. The dimension of or between the detected parallel edges can be displayed on the display screen in pixels, distance or any other form as desired.

An alternate embodiment according to the present invention can operate in 'contract' mode. In 'contract' mode, the present invention also provides the measurements of a rectangular boundary around any given object(s), or distance between outside edges of clusters of object(s) immediately. The program/tool can also measure an area without a defined interior. The end user will move the pointer and draw a box loosely outside such an area. The box will contract to the size of the area as defined by pixels, which may be part of one or more objects within the area, having different image characteristics as compared to pixel image characteristics of the region wherein the box was loosely initially drawn, and provide the dimensions automatically.

BRIEF DESCRIPTION OF THE DRAWINGS

These and further features of the present invention will be apparent when read together with the Detailed Description of the Preferred Embodiment, wherein.

DETAILED DESCRIPTION OF AN EXEMPLARY EMBODIMENT

Figure 1:
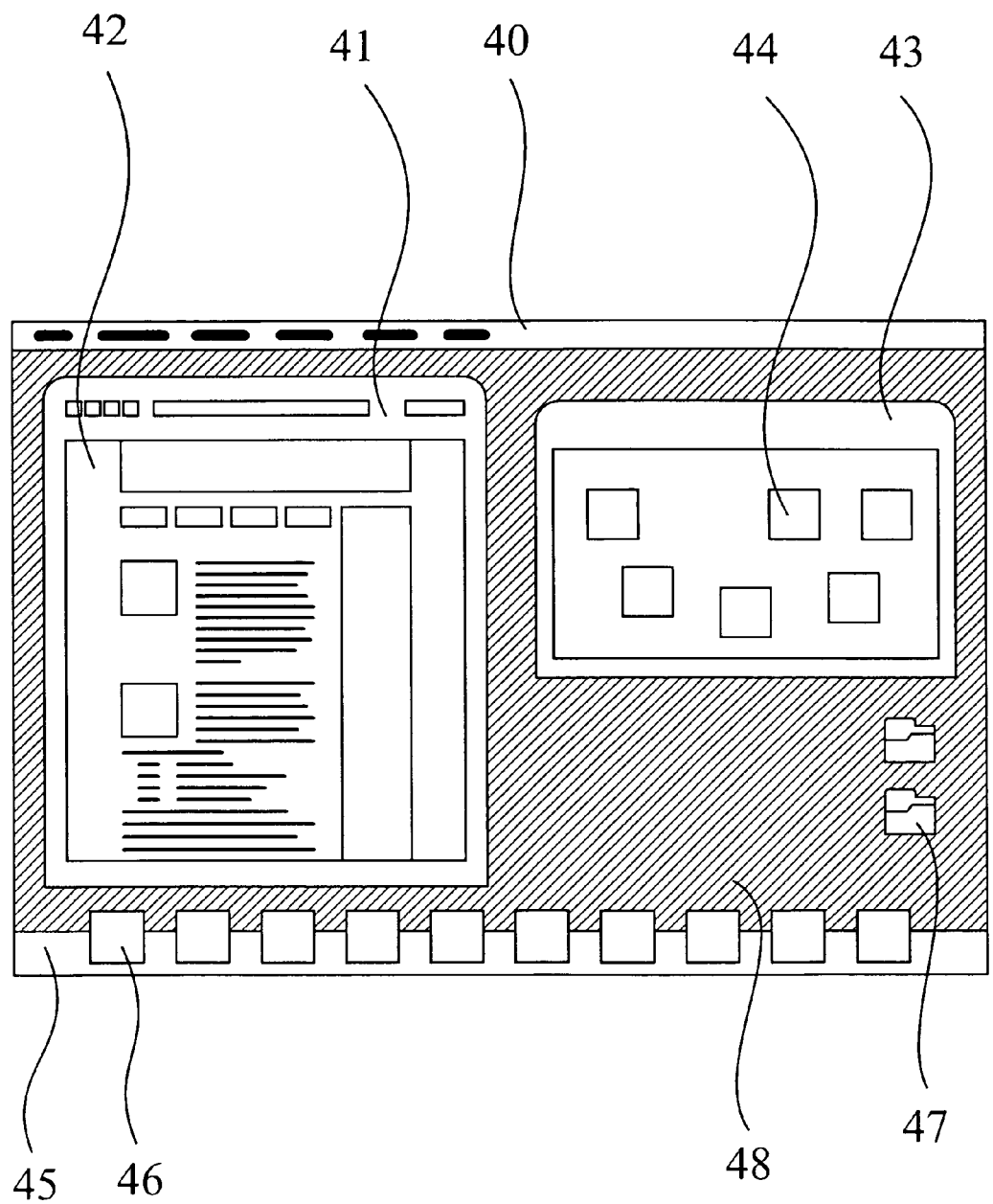
FIG. 1 shows an image of a typical computer screen with a web browser opened, a directory open on the desktop, menu bar on the top of the screen, taskbar/dock on the bottom of the screen.

According to one exemplary embodiment, the measuring tool according to the present invention begins with a generic computer screen display FIG. 1. For example, a menu bar 40 on top for the application running, in this case a web browser 41, with a web site 42 loaded. Underneath is a directory 43 open in the background with files inside 44. A task bar 45 on the bottom with icons 46 displayed. And lose folders 47 lose on the desktop 48.

A typical computing device allocated a portion of its memory to generate the imagery for the display called screen buffer, typically part of the computer memory and includes multiple data that corresponds to image qualities, e.g. color value, saturation, intensity (brightness), etc. and 'describes' what the user sees on the screen as a single bitmap have such constituent pixels. Unlike any previous applications, the measuring tool act as a overlay by utilizing access to the screen buffer as a separate program operating in the associated computer (not shown). Therefore, no matter what program is in the foreground or background, this tool will measure anything on the display via access to the associated screen memory or buffer, and not limited to just one application or one application display.

Figure 2:
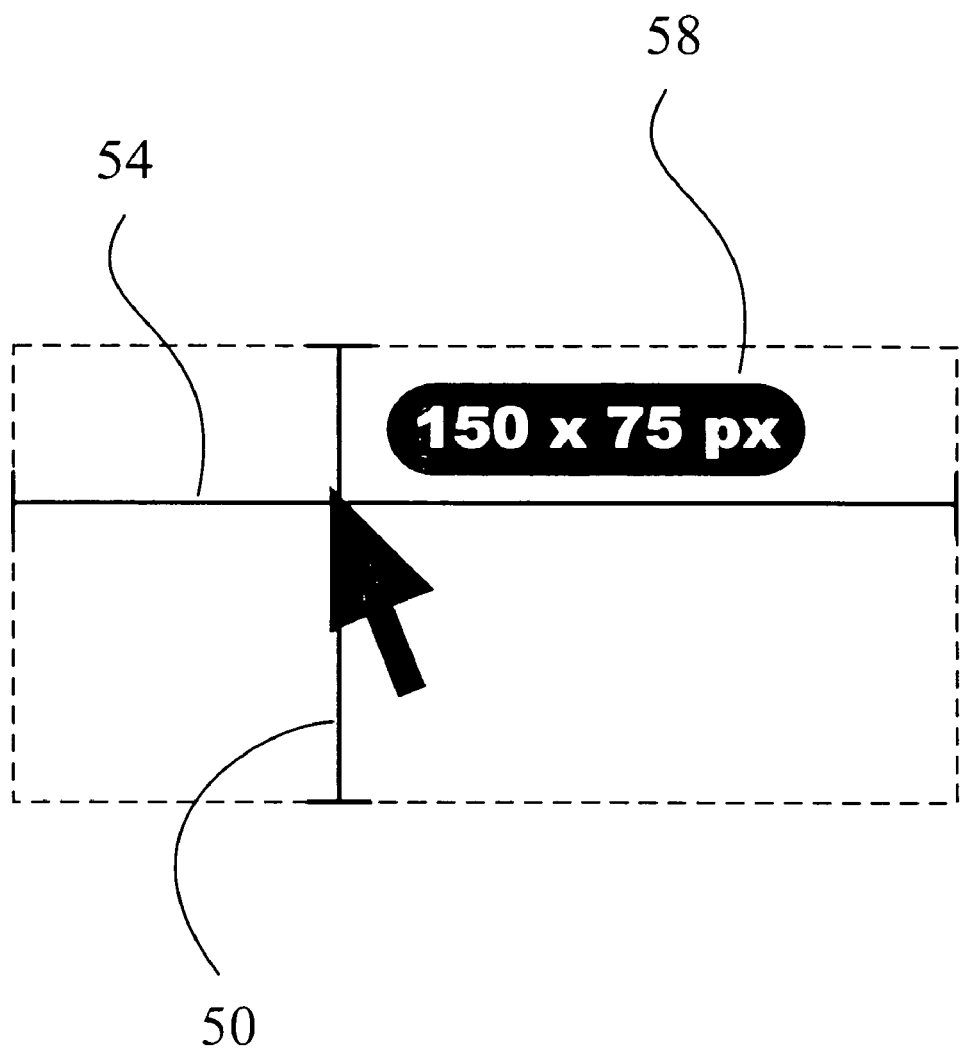
FIG. 2 shows an image of the screen indication of outward dimension in one embodiment of the present invention with screen dimensions indication of numbers of pixels and orthogonal lines to the (detected) edges.

Once the tool is activated (e.g. by screen or menu selection), the end user can place the pointer, e.g. a mouse with a corresponding screen cursor, anywhere on the display. As soon as the pointer/cursor's movement stops, a vertical 50 and horizontal line 54 will extend out to indicate the area the tool is measuring and immediately provide the dimensions 58 right next to the pointer/cursor FIG. 2.

The detection works by analyzing the pixels underneath the mouse cursor in the screen buffer. The algorithm uses edge detection on image pixels in the screen buffer to determine the edges of elements visible on the screen. According to the present invention, the program method starts to look at a pixel-block at the mouse location and outward or away from there (in each of 4 directions) and examines the data values of short pixel-stripes going out in lines or directions to the left, right, top, and bottom. It stops when it detects an edge. The measurement of the distance between the edges (or any other dimension pixel 'edge') is then displayed from the found left to the found right edge, and from the found top to the found bottom edge.

The three basic rules of edge detection algorithm are as follow:

1. If a solid block of color (e.g. color related values within a specified range) is detected in the pixel-block at mouse location, surrounding pixels-stripes (e.g. contiguous pixels extending along one dimension) are checked until a different color is found. This mode works typically is chosen for graphic image layouts that are based on solid colors.

2. If a gradient (e.g. gradual change in an image parameter) is detected in an pixel-block (a group of contiguous pixels forming an area) underneath the screen cursor, the embodiment according to the present invention checks, in a direction outward from the pixel-block, for variations in color compared to the preceding (after the pixel-block) pixel-strip, and if there is a change in color higher than a set-able threshold, an edge is detected. The embodiment according to the present invention operable in this mode works is applied to a graphic image layout based on backgrounds having gradient changes in pixel image data.

3. If a non-uniform pattern (as determined by a measurable difference in pixel image data, wherein the image data difference values are within a selected range or threshold, or any other difference criterion which may be user-defined or known in the art) is found in a pixel-block underneath the cursor, an embodiment of the present invention looks for pixel stripes that are more uniform in color and their change in color from the preceding pixel-strip (outside the pixel-block) where the differences (and associated difference values) are outside the selected threshold. This embodiment mode can be applied to images including photos and complex layouts. The threshold for the gradient and the non-uniform pattern embodiments may be preset or be user definable. Most often, any threshold that is between the extremes will bring good results.

Figure 3:
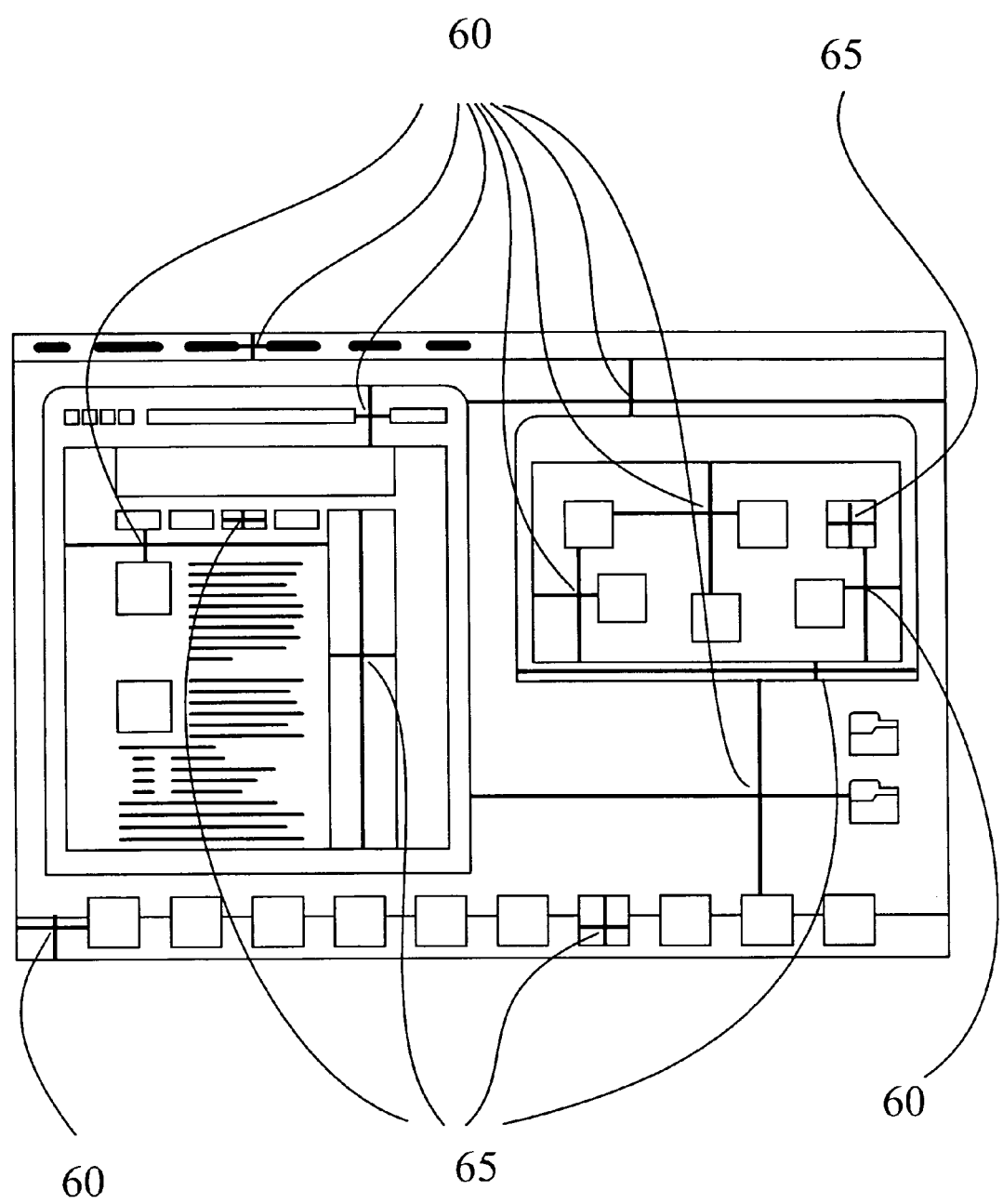
FIG. 3 shows an image of the typical screen of FIG. 1 with the application according to one embodiment of the present invention operating to provide the dimensions with vertical and horizontal lines indicating the detection the edges of the image.

The application images of FIG. 3 demonstrate that the measure tool according to the present invention can measure ('expand' mode) anything displayed on screen with ease. For instance measurement of gaps 60 between images, graphics and user interface, as well as the dimensions of those elements 65 are easily provided according to the present invention.

Figure 4A:
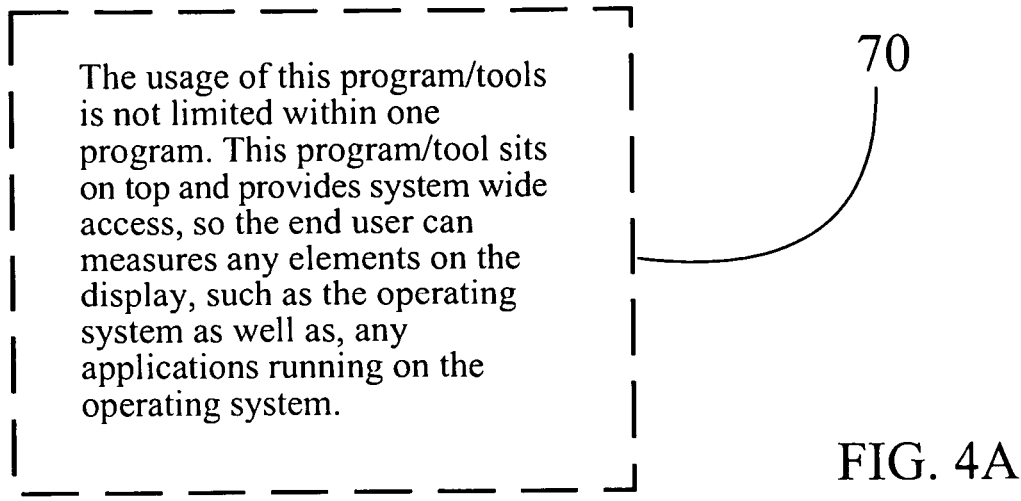
FIGS. 4A-4B shows one embodiment of a typical initial tool placement for measuring outer dimensions of a block of text in contract mode.
Figure 4B:
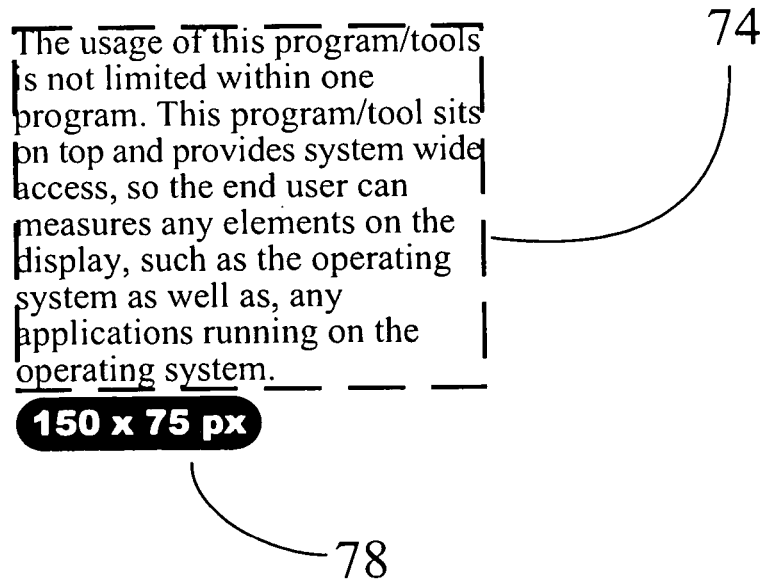
Figure 5A:
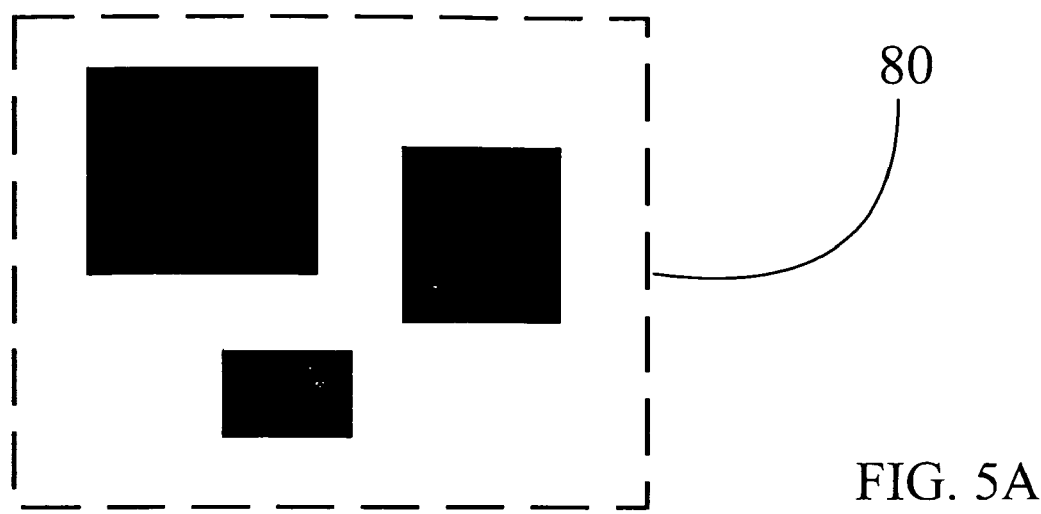
FIGS. 5A-5B shows typical resulting values and display of the tool measuring a block of images in contract mode of the embodiment of FIGS. 4A-4B.
Figure 5B:
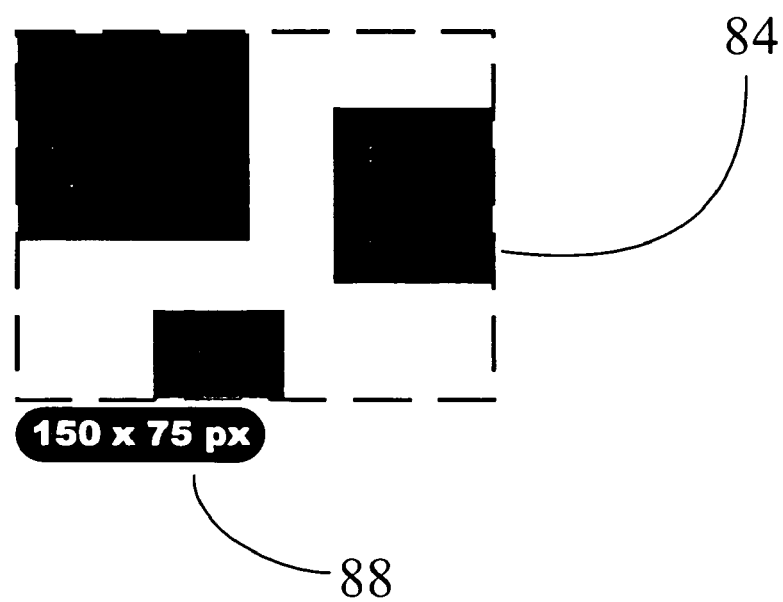

In 'contract' mode, once the end user draws a box around a block of text FIG. 4A 70, it will immediately contract on all four sides until they reach an edge FIG. 4B 74. The tool will then provide the dimensions immediately 78.

Similarly, the 'contract' mode can be used to measure the size (outside edges) of a group of images in FIGS. 5A-B 80-88.

Measurements displayed are typically in numbers of pixels of each dimension, but according to the present invention, may also display any related linear dimension, e.g inches, etc. by a scaling process as desired. Moreover, the dimension displayed may be the number of pixels up to but not including the pixel of the detected change, and other embodiments may include the pixel of the detected change in the dimension measurement. The term 'color' also includes white, black and all intervening gray values. Modifications and substitutions by one of ordinary skill in the art are within the scope of the present invention which is not to be limited except by the claims which follow.

What is claimed is:

1. A method of 2 dimensional measurement of an image on a computer display, comprising the steps of:
    accessing a computer screen display buffer with an associated computer processor, wherein said computer screen display provides images thereon defined by sets of opposite dimensions including left and right, and up and down dimensions;
    locating data within said display buffer, pixel image values corresponding to a starting point on said computer display image;
    accessing within said display buffer, data in a first of each of said screen dimensions relative to said starting point and one of:
        determining the presence of a solid block of color according to a selected number of pixels contiguous with said starting point pixel corresponding to said starting point and having a color value within a selected solid block range then determining in a sequence outward from said selected number of pixels outward along said dimension the occurrence of a pixel color value outside said selected solid block range, and storing as a determined location said pixel not within said selected block range,
        determining a gradient within said selected number of pixels of a change in one of color value, color saturation and intensity associated with said selected number of pixels and subsequently determining a pixel gradient of least one of color value and color saturation in a set of contiguous pixels initially adjacent to and subsequently outward from said selected number of pixels along said dimension a selected amount not within a selected gradient range along a pixel strip and storing as a determined location said pixel gradient detected not within said selected gradient range, and
        determining a non-uniform pixel pattern according to a difference of adjacent pixel values within a selected range of difference values of at least one of pixel color value and color saturation within a block of pixels comprising said selected number of contiguous pixels including said starting point, then checking for a pixel strip of contiguous pixels of greater uniformity according to said difference of values of said pixel strip not within said range of difference values initially adjacent to and subsequently outward along said dimension from said block of pixels then storing as a determined location said pixel strip of greater uniformity;
    determining the number of pixels of a dimension between at least one set of opposite determined locations.

2. The method of claim 1, further including the step of determining a dimensional measurement according to differences in pixel addresses of said opposite determined locations.

3. The method of claim 2, wherein said step of determining a dimensional measurement comprises the step of subtracting the differences in pixel addresses of said opposite determined locations.

4. The method of claim 1, further comprising the step of providing said dimensional measurement as an image on said computer display according to said opposite determined locations.

5. The method of claim 1, further comprising the step of drawing a line on said computer display to the end of each dimension.

6. A method of determining orthogonal dimensions of a defined rectangular area on a graphic display comprising rows and columns of constituent pixels, comprising the steps of:

defining a rectangular boundary comprising a plurality of linear elements of contiguous pixels having a consistency of selected image parameters determined relative to a selected range;

moving each of the elements of said rectangular boundary toward at least one other of said elements until a pixel is detected having an image parameter outside said selected range;

when pixels are detected having an image parameter outside said selected range for each of said elements, determining the distances between parallel elements of said rectangular boundary.

7. The method of claim 6, wherein said selected parameters comprises at least one of color value, color saturation and intensity.

8. The method of claim 6, wherein the step of determining the distance comprises the step of subtracting the pixel addresses corresponding to said parallel elements.

9. The method of claim 8, wherein said step of subtracting comprises the step of subtracting the pixel addresses and further subtracting 1 to provide a distance between said parallel elements.

10. The method of claim 6, further including the step of displaying information corresponding to said distances between said parallel elements.

11. A method of measuring orthogonal dimensions on a display screen having images displayed thereon from a corresponding memory, comprising the steps of:

locating on said display screen a starting point comprising at least one pixel and said corresponding starting point memory location;

determining at least one image characteristic of said starting point;

determining a threshold value of said at least one image characteristic;

reading memory locations in one of a row and column relative to said starting point memory location along a first direction from said starting point until a pixel image characteristic not within said threshold value is detected and identifying a corresponding a first memory location thereof;

reading memory locations in said one of a row and column relative to said starting point memory location from said starting point along a second direction opposite said first direction until a pixel image characteristic is image characteristic not within said threshold value is detected and identifying a corresponding second memory location; and determining a first dimension according to said first and said second memory locations.

12. The method of claim 11, wherein at least one of said first and said second memory locations corresponds to a memory addresses of a pixel having said pixel image characteristic within said threshold and is adjacent to said pixel having said image characteristic not within said threshold value.

13. The method of claim 12, further including the steps of:

reading memory locations in the other of a row and column relative to said starting point memory location along a third direction until a pixel image characteristic is image characteristic not within said threshold value is detected and identifying a corresponding a third memory location, reading memory locations in said other of a row and column relative to said starting point memory location along a fourth direction opposite said third direction until a pixel image characteristic is image characteristic not within said threshold value is detected and identifying a corresponding fourth memory location, and determining a second dimension according to said third and said fourth memory locations.

14. The method of claim 13, wherein at least one of said third and said fourth memory locations corresponds to a memory address of a pixel having said pixel image characteristic within said-threshold and is adjacent to said pixel having said image characteristic not within said threshold value.

15. The method of claim 11, wherein said image characteristics comprises at least one of image color, saturation and intensity.

16. The method of claim 11, wherein said starting point comprises a plurality of contiguous pixels having one of a uniform image characteristic within a selected starting point range, a gradient image characteristic within a starting point gradient range, and a non-uniform image characteristic within a non-uniformity criterion range.

17. The method of claim 16, wherein said steps of reading memory locations includes the step of one of detecting a uniformity of an image characteristics within a said starting point range of pixels outward from said starting point until a pixel not within said starting point range is detected, detecting a gradient of contiguous pixels not within said starting point gradient range and located within pixel strips disposed outward from said starting point, and detecting a non-uniformity of image characteristics not within said non-uniformity criterion range.

18. The method of claim 11, before the step of locating, the further steps of moving an object having corresponding display screen indicator, and determining when said indicator has ceased moving.

19. The method of claim 18, further including the step of defining a display screen location of said screen indicator as said starting point after said indicator has ceased moving.

20. The method of claim 18, further including the step of displaying at least one of a provide a numeric indicator of each said dimension on said display screen and providing a line corresponding to each said dimension on said display screen.

* * * * *